United States Patent
Bar-Ness et al.

(10) Patent No.: US 8,064,428 B2
(45) Date of Patent: Nov. 22, 2011

(54) METHOD AND APPARATUS FOR ORDERING RETRANSMISSIONS IN AN NXM MIMO SYSTEM

(75) Inventors: Yeheskel Bar-Ness, Marlboro, NJ (US); Ye-Hoon Lee, Suwon-si (KR); Dong-Ho Kim, Seoul (KR); Guillem Malagarriga, Vilasser De Mar (ES)

(73) Assignees: Samsung Electronics Co., Ltd., Suwon-si (KR); New Jersey Institute of Technology, Newark, NJ (US)

( * ) Notice: Subject to any disclaimer, the term of this patent is extended or adjusted under 35 U.S.C. 154(b) by 732 days.

(21) Appl. No.: 11/503,289

(22) Filed: Aug. 11, 2006

(65) Prior Publication Data

US 2007/0115864 A1     May 24, 2007

Related U.S. Application Data

(60) Provisional application No. 60/707,830, filed on Aug. 12, 2005.

(30) Foreign Application Priority Data

Aug. 10, 2006   (KR) .................. 10-2006-0075758

(51) Int. Cl.
    *H04J 3/24*     (2006.01)
(52) U.S. Cl. ........ 370/349; 370/252; 370/315; 370/465; 375/267; 375/347; 375/295; 375/296
(58) Field of Classification Search .............. 455/7, 101; 370/252, 315, 465, 473, 459; 375/267, 347, 375/295, 296
See application file for complete search history.

(56) References Cited

U.S. PATENT DOCUMENTS

| 2004/0057530 | A1* | 3/2004 | Tarokh et al. | 375/267 |
| 2004/0178954 | A1* | 9/2004 | Vook et al. | 342/383 |
| 2005/0111376 | A1* | 5/2005 | Raghothaman et al. | 370/252 |
| 2005/0281322 | A1* | 12/2005 | Lee et al. | 375/146 |
| 2006/0045062 | A1* | 3/2006 | Gorokhov et al. | 370/343 |
| 2006/0209884 | A1* | 9/2006 | MacMullan et al. | 370/465 |
| 2006/0233200 | A1* | 10/2006 | Fifield et al. | 370/473 |

FOREIGN PATENT DOCUMENTS

| EP | 1 742 383 | 1/2007 |
| WO | WO 2004/028063 | 4/2004 |
| WO | WO 2005107099 | 11/2005 |

OTHER PUBLICATIONS

Acolatse et al. (2005); An Alamouti-based Hybrid-ARG Scheme for MIMO Systems.*

* cited by examiner

*Primary Examiner* — Kamran Afshar
*Assistant Examiner* — Manpreet Matharu
(74) *Attorney, Agent, or Firm* — NSIP Law

(57) ABSTRACT

A method is provided for ordering retransmissions in a Multi-Input Multi-Output (MIMO) system using N×M antennas. A transmitter splits a coded data stream into N sub-packets, and transmits the N sub-packets to a receiver via N transmission antennas. The receiver removes interferences of the N sub-packets received via M reception antennas, and independently decodes the interference-removed sub-packets. The receiver transmits an acknowledgement (ACK) or a negative acknowledgement (NACK) to the transmitter based on errors included in the decoded sub-packets. Upon receipt of the NACK, the transmitter retransmits to the receiver a sub-packet retransmission using ordering based on an Alamouti space-time coding scheme.

20 Claims, 6 Drawing Sheets

METHOD AND APPARATUS FOR ORDERING RETRANSMISSIONS IN AN NXM MIMO SYSTEM

PRIORITY

This application claims priority to a provisional application entitled "Method and Apparatus for Ordering Retransmissions in an N×M MIMO System", filed in the United States Patent and Trademark Office on Aug. 12, 2005 and assigned Ser. No. 60/707,830, and under 35 U.S.C. §119 to an application entitled "Method and Apparatus for Ordering Retransmissions in an N×M MIMO System" filed in the Korean Intellectual Property Office on Aug. 10, 2006 and assigned Serial No. 2006-75758, the contents of both of which are incorporated herein by reference.

COMPUTER PROGRAM LISTING APPENDIX

This application includes a computer program listing appendix that has been submitted via a compact disc and which is incorporated herein by reference in its entirety for all purposes. The compact disc has been submitted in duplicate. The compact disc includes a file named "Computer Program Listing" which was created on Sep. 20, 2011, and which has a size of 64 kilobytes (kb).

BACKGROUND OF THE INVENTION

1. Field of the Invention

The present invention relates generally to a method and apparatus for ordering retransmissions in a Multi-Input Multi-Output (MIMO) system using N transmission antennas and M reception antennas (N×M Antennas), and in particular, to a method and apparatus for ordering retransmissions each antenna by utilizing Alamouti space-time coding instead of multiplying a unitary matrix when the next packet is retransmitted, for a preprocessing process, in a MIMO system using N×M antennas (hereinafter referred to as an "N×M MIMO system").

2. Description of the Related Art

The MIMO system using multiple transmission/reception antennas, which is a wireless transmission scheme capable of maximizing a diversity gain and a data rate through multiplexing, will serve as the core technology of the next generation mobile communication system. Automatic Repeat reQuest (ARQ) protocol is error control means for overcoming packet transmission errors frequently occurring in a poor wireless channel.

In addition, Hybrid Automatic Repeat reQuest (HARQ) protocol is being adopted in the standard as a scheme for maximizing retransmissions. The HARQ protocol is a combination of Forward Error Correction (FEC) and ARQ scheme. According to the HARQ protocol, a receiver attempts error correction through FEC, and attempts retransmission if the receiver fails in the error correction. In order to adaptively cope with an instantaneous change in a channel state, the receiver can transmit additional parity information or merge additional parity bits with repeatedly received data information instead of changing a coding rate at every retransmission, to gradually improve error correction capability.

A system using the combined HARQ and MIMO (hereinafter referred to as a "MIMO HARQ system") depends on a variation of interference signal amplitude of combined signal of a receiver based on the selection of retransmission ordering each antenna, greatly affecting its HARQ performance. Therefore, there is a need for a method capable of optimizing selection of retransmission ordering.

SUMMARY OF THE INVENTION

It is, therefore, an aspect of the present invention to provide a retransmission ordering method and apparatus in an N×M MIMO system, capable of obtaining the highest signal-to-noise ratio (SNR) of a receiver by utilizing Alamouti space-time coding instead of multiplying a unitary matrix when the next packet is retransmitted.

According to one aspect of the present invention, there is provided a method for ordering retransmissions in a Multi-Input Multi-Output (MIMO) system using N×M antennas. The method includes splitting, at a transmitter, a coded data stream into N sub-packets, and transmitting the N sub-packets to a receiver via N transmission antennas; removing, at the receiver, interferences of the N sub-packets received via M reception antennas, and independently decoding the interference-removed sub-packets; transmitting, at the receiver, an acknowledgement (ACK) or a negative acknowledgement (NACK) to the transmitter according to whether there is any error included in the decoded sub-packets; and upon receipt of the NACK, retransmitting to the receiver a sub-packet retransmission using ordering based on an Alamouti space-time coding scheme.

According to another aspect of the present invention, there is provided a transmission apparatus for ordering retransmissions in a Multi-Input Multi-Output (MIMO) system using N×M antennas. The transmission apparatus includes a channel encoder for encoding input information bits based on a coding scheme, and generating coded packets having a specific length; a spatial demultiplexer for encoding the coded packets based on a space-time coding scheme, and parallel-converting the packets into N sub-blocks; symbol mappers for modulating the sub-blocks into modulation symbol streams using a modulation scheme, mapping the symbol streams to times and frequencies based on a pilot sub-carrier position set pattern, and outputting the mapping results to associated transmission antennas; and N transmission antennas for separately transmitting N sub-packets split from each of the coded symbol streams. Upon receipt of a negative acknowledgement (NACK) due to an error of a transmitted packet, the apparatus retransmits to a receiver a packet retransmission using ordering based on an Alamouti space-time coding scheme.

According to a further aspect of the present invention, there is provided a reception apparatus for ordering retransmissions in a Multi-Input Multi-Output (MIMO) system using N×M antennas. The reception apparatus includes M reception antennas for separately receiving N sub-packets split from a coded symbol stream; a pre-combiner for combining a packet retransmitted according to retransmission ordering with a previous defective packet on a symbol level; and a detector for removing interference of a signal received from the pre-combiner, splitting the interference-removed signal into N transmission data sub-packets, and outputting independently decoded sub-packet signals. The apparatus transmits an acknowledgement (ACK) or a negative acknowledgement (NACK) to a transmitter according to whether there is any error included in the decoded sub-packet.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

Figure 1:
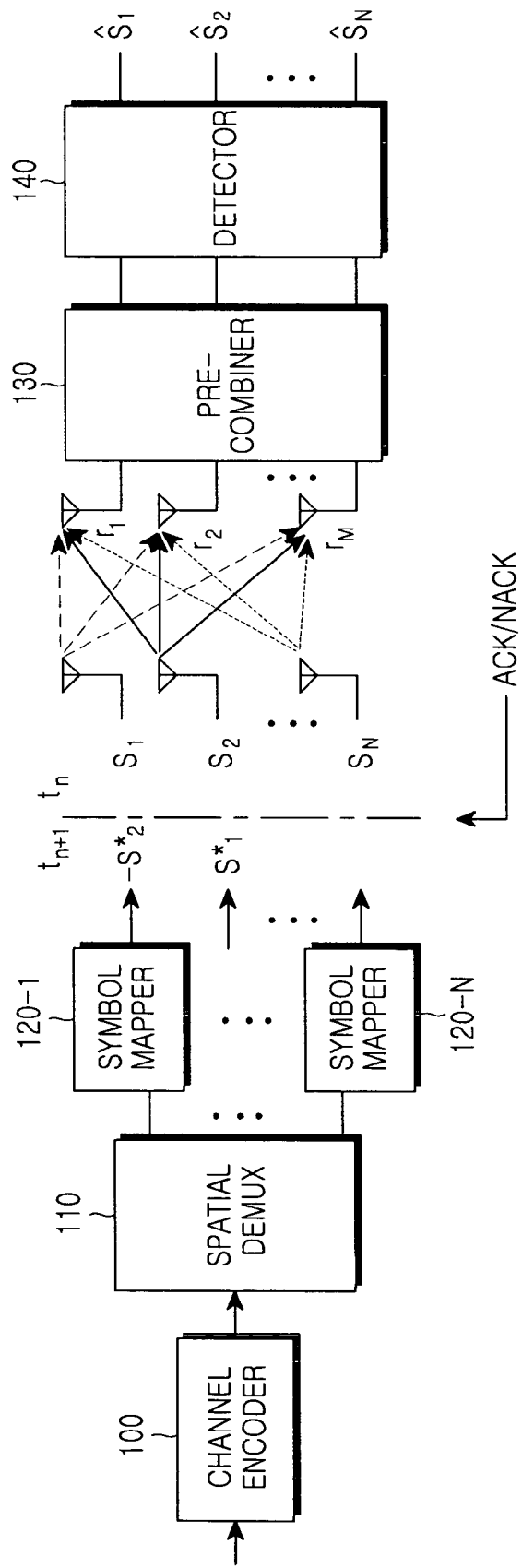
FIG. 1 is a diagram illustrating an exemplary N×M MIMO HARQ system according to the present invention.

Exemplary embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

The present invention relates to MIMO HARQ technology for an N×M MIMO channel, and proposes an algorithm for selecting retransmission signals based on a channel matrix measured and consisted of retransmission signals each antenna by utilizing Alamouti space-time coding instead of multiplying a unitary matrix when the next packet is retransmitted. With reference to FIG. 1, an introduction will now be made of an N×M MIMO HARQ system model to which the present invention is applied.

FIG. 1 is a diagram illustrating an exemplary N×M MIMO HARQ system according to the present invention.

Referring to FIG. 1, a transmitter includes a channel encoder 100, a spatial demultiplexer (DEMUX) 110, and symbol mappers 120-1 to 120-N. In the N×M MIMO system including N transmission antennas and M reception antennas, if information bits are input to the transmitter, the channel encoder 100 encodes the input information bits based on a coding scheme, generating coded packets having a specific length. The spatial demultiplexer 110 encodes the coded packets based on a space-time coding scheme, and parallel-converts the coded packets in to N sub-blocks. The space-time coding scheme can be formed in various types considering diversity gain and transfer rate, and signals formed according to transmission antenna N can be formed in various types. Also signals to be sent can be selected at a predetermined time by using the formation of channel condition and interference signal among the space-time coding signals on transmission time. The symbol mappers 120-1 to 120-N modulate the sub-blocks using a modulation scheme, generating modulation symbol streams, map the modulation symbol streams to times and frequencies based on a pilot sub-carrier position set pattern, and output the mapping results to associated transmission antennas.

In FIG. 1, signal sub-packets transmitted from transmission antennas #1 to #N are denoted by $s_1$ to $s_N$, respectively, and signal vectors received at reception antennas #1 to #M are noted by $r_1$ to $r_M$, respectively. Each of the received signal vectors is decoded at each transmission, and if an error is detected therefrom, a receiver requests retransmission of the corresponding packet. The retransmitted packet is combined with the previous defective packet on a symbol level.

The receiver includes a pre-combiner 130 and a detector 140. The pre-combiner 130 demodulates the received signal vectors $r_1$ to $r_M$ by using a demodulation such as a matching filter, and combines the demodulated symbols with the demodulated symbols of the previous defective packet. The interferences of signals through the pre-combiner are removed therefrom by Minimum Mean Square Examination (MMSE) or Zero Forcing (ZF). The detector 140 estimates received signal vectors, and outputs decoded signals.

After a predetermined number of transmissions, the receiver separates N transmission data packets from the interference-removed signals, and independently decodes the data packets. After the decoding, if there are no errors in the received packet, the receiver transmits an Acknowledgement (ACK) to the transmitter, accepting the received packet. However, if there are errors in the received packet, the receiver transmits a Negative Acknowledgement (NACK) to the transmitter. Upon receipt of the NACK, the transmitter retransmits to the receiver the packet considering channel condition and signal-to-noise ratio (SNR) each antenna among retransmissions signals formed by using the Alamouti space-time coding scheme.

Next, a detailed description will be made of an exemplary Alamouti space-time coding scheme indicating that each signal-to-noise ratio (SNR) value is calculated at each retransmission and the highest SNR value is directly associated with a value determined by maximizing a determinant that derives a channel matrix after each retransmission. In particular, a description will be made of a retransmission algorithm that uses multi-Alamouti space-time coding based on a channel matrix measured for 3×3 MIMO. In this case, a receiver selects retransmission ordering and communicates with a transmitter. An SNR criterion is used for the selection of the retransmission ordering.

SNR Criterion

For a 3×3 MIMO system, a received signal vector r can be modeled as Equation (1):

$$r^{(1)} = Hs^{(1)} + n^{(1)} \quad (1)$$

where n denotes an Additive White Gaussian Noise (AWGN) vector, and H is defined as Equation (2):

$$H = \begin{bmatrix} h_{11} & h_{12} & h_{13} \\ h_{21} & h_{22} & h_{23} \\ h_{31} & h_{32} & h_{33} \end{bmatrix} \quad (2)$$

In addition, $s^{(1)} = [s_1, s_2, s_3]^T$ denotes a space-time transmission demultiplexed signal on initial transmission. The space-time transmission demultiplexed signal in 3×3 MIMO can be expressed as Equation (3):

$$\begin{array}{cccc} s^{(i)}_0 & s^{(i)}_1 & s^{(i)}_2 & s^{(i)}_3 \end{array} \quad (3)$$

$$\begin{bmatrix} s_1 & -s_2^* & s_3^* & 0 \\ s_2 & s_1^* & 0 & -s_3^* \\ s_3 & 0 & -s_1^* & s_2^* \end{bmatrix}$$

where i denote the number of ith transmission, the $s^{(1)} = [s_1, s_2, s_3]^T$ is a example of $s^{(1)} = s^{(i)}_0$ transmission.

Also, columns of retransmission matrix can be expressed as Equation (4)

$$s^{(i)}{}_1 = \begin{bmatrix} -s_2^* \\ s_1^* \\ 0 \end{bmatrix} = \gamma_1 s^{(i)}{}_0{}^*, \quad (4)$$

$$s^{(i)}{}_2 = \begin{bmatrix} 0 \\ -s_3^* \\ s_2^* \end{bmatrix} = \gamma_2 s^{(i)}{}_0{}^*,$$

$$s^{(i)}{}_3 = \begin{bmatrix} s_3^* \\ 0 \\ -s_1^* \end{bmatrix} = \gamma_3 s^{(i)}{}_0{}^*$$

where $$\gamma_1 = \begin{bmatrix} 0 & -1 & 0 \\ 1 & 0 & 0 \\ 0 & 0 & 0 \end{bmatrix}, \gamma_2 = \begin{bmatrix} 0 & 0 & 0 \\ 0 & 0 & -1 \\ 0 & 1 & 0 \end{bmatrix} \text{ and } \gamma_3 = \begin{bmatrix} 0 & 0 & 1 \\ 0 & 0 & 0 \\ -1 & 0 & 0 \end{bmatrix}$$

The received signal vector, after undergoing matched filtering in the receiver, is shown as Equation (5):

$$x^{(1)} = H^\psi H s^{(1)} + H^\psi n^{(1)} = C_1 s^{(1)} + H^\psi n^{(1)} \quad (5)$$

where $(\cdot)^\psi$ denotes a transpose operation.

If ZF is performed, the result is shown as Equation (6):

$$\hat{s}_1 = C_1^{-1} x^{(1)} = s^{(1)} + C_1^{-1} H^\psi n^{(1)} \quad (6)$$

where $$C_1 = \begin{bmatrix} a_{11} & a_{12} & a_{13} \\ a_{12}^* & a_{22} & a_{23} \\ a_{13}^* & a_{23}^* & a_{33} \end{bmatrix}.$$

If a detection error occurs in after first transmission, transmission signal $s^{(2)}$ of second transmission $R_2$ can be transmitted by selecting one signal among the signals of the Equation (3). Received signal according to second transmission can be expressed as Equation (7):

$$r^{(2)} = H s^{(2)j} + n^{(2)} = H \gamma_j s^{(1)*} + n^{(2)}, \text{ for } j \in (1,2,3) \quad (7)$$

where j will depend on the SNR criterion.

If a conjugate $r^{(2)*}$ is taken for the matched filtering and then multiplied by $\gamma_i^T H^T$, then the result is shown in Equation (8):

$$x^{(2)} = \gamma_i^T C_1^* \gamma_j s^{(1)} + \gamma_i^T H^T n^{(2)*} \quad (8)$$

If ZF is performed on a combination of $x^{(1)}$ and $x^{(2)}$, then the result is shown in Equation (9):

$$\hat{s}^{(1,2)} = s + C_2^{-1}(H^\psi n^{(1)} + \gamma_j^T H^T n^{(2)*}) \quad (9)$$

where $C_2 = (C_1 + \gamma_j^T C_1^* \gamma_j)$.

In order to determine a preferred j, the receiver uses the highest SNR. An autocorrelation matrix of noise can be expressed as Equation (10):

$$R_{NN} = E\{[C_2^{-1}(H^\psi n^{(1)} + \gamma_i^T H^T n^{(2)*})][n^{(2)*} H^T \gamma^T + n^{(1)} H^\psi] C_2^{-1}]^\psi\} \quad (10)$$

or Equation (11):

$$R_{NN} = \sigma^2 C_2^{-\psi} \quad (11)$$

where it is assumed that $n^{(1)}$ and $n^{(2)*}$ are non-correlative to each other, and are equal to each other in $\sigma^2$ indicative of noise variances of components of $n^{(1)}$ and $n^{(2)*}$.

If an SNR within each antenna for each i is calculated to normalize signal power to '1', then the result is shown in Equation (12):

1) for $j = 1$, (12)

$$C_2 = \begin{bmatrix} b_1 & 0 & a_{13} \\ 0 & b_1 & a_{23} \\ a_{13}^* & a_{23}^* & a_{33} \end{bmatrix}$$

where $b_1 = a_{11} + a_{22}$.

Therefore, each branch of the receive SNR is given as Equation (13):

$$SNR_1^{(1)} = \frac{b_1^2 a_{33} - b_1(|a_{13}|^2 + |a_{23}|^2)}{\sigma^2(b_1 a_{33} - |a_{23}|^2)} \quad (13)$$

$$SNR_1^{(2)} = \frac{b_1^2 a_{33} - b_1(|a_{13}|^2 + |a_{23}|^2)}{\sigma^2(b_1 a_{33} - |a_{13}|^2)}$$

$$SNR_1^{(3)} = \frac{b_1 a_{33} - b_1(|a_{13}|^2 + |a_{23}|^2)}{\sigma^2 b_1^2}$$

2) for $j = 2$, (14)

$$C_2 = \begin{bmatrix} a_{11} & a_{12} & a_{13} \\ a_{12}^* & b_2 & 0 \\ a_{13}^* & 0 & b_2 \end{bmatrix}$$

where $b_2 = a_{22} + a_{33}$.

Therefore, at each branch of each receiver, an SNR is given as Equation (15):

$$SNR_2^{(1)} = \frac{b_2^2 a_{11} - b_2(|a_{13}|^2 + |a_{12}|^2)}{\sigma^2(b_2 a_{11} - |a_{13}|^2)} \quad (15)$$

$$SNR_2^{(2)} = \frac{b_2^2 a_{11} - b_2(|a_{13}|^2 + |a_{12}|^2)}{\sigma^2(b_2 a_{11} - |a_{12}|^2)}$$

$$SNR_2^{(3)} = \frac{b_2^2 a_{11} - b_2(|a_{13}|^2 + |a_{12}|^2)}{\sigma^2 b_2^2}$$

3) for $j = 3$, (16)

$$C_2 = \begin{bmatrix} b_3 & a_{12} & 0 \\ a_{12}^* & a_{22} & a_{23} \\ 0 & a_{23}^* & b_3 \end{bmatrix}$$

where $b_3 = a_{11} + a_{33}$.

Therefore, an SNR of each branch is given as Equation (17):

$$SNR_3^{(1)} = \frac{b_3^2 a_{22} - b_3(|a_{12}|^2 + |a_{23}|^2)}{\sigma^2(b_3 a_{22} - |a_{12}|^2)} \quad (17)$$

$$SNR_3^{(2)} = \frac{b_3^2 a_{22} - b_3(|a_{12}|^2 + |a_{23}|^2)}{\sigma^2(b_3 a_{22} - |a_{23}|)}$$

$$SNR_3^{(3)} = \frac{b_3^2 a_{22} - b_3(|a_{12}|^2 + |a_{23}|^2)}{\sigma^2 b_3^2}$$

Herein, for every j, the SNR expression of the branch takes the same numerator as a determinant of $C_2$. Therefore, a vector $s^{(i)}$ results from the largest numerator of its own SNR, and becomes a first one to be sent at the next transmission $R_2$.

After the second transmission, if a detection error will still exist in a Cyclic Redundancy Check (CRC) code, signal to be sent at the third transmission $R_3$ can transmit by selecting according to Equation (3), and a received signal is given as Equation (18):

$$\hat{s}_{1,2,3} = s + C_3^{-1}(H^\psi n^{(1)} + \gamma_i{}^T H^T n^{(2)*} + \gamma_{i+1}{}^T H^T n^{(3)*}) \quad (18)$$

where $C_3 = (C_1 + \gamma_i{}^T C_1{}^* \gamma_i + \gamma_{i+1}{}^T C_1{}^* \gamma_{i+1})$.

Again, a noise correlation matrix is given as Equation (19):

$$R_{NN} = \sigma^2 C_3^{-\psi} \quad (19)$$

However, a matrix between only two of the 3 different possibilities can be determined, and one of the vectors is determined through a previous process.

1) If vector sequences are $s^{(2)_1}$ and $s^{(3)_2}$, then the result is shown in Equation (20):

$$C_3 = \begin{bmatrix} b_1 & 0 & a_{13} \\ 0 & b_1 + a_{33} & 0 \\ a_{13}^* & 0 & b_2 \end{bmatrix} \quad (20)$$

For each branch of the receiver, an SNR is given as Equation (21):

$$SNR_1^{(1)} = \frac{b_1 b_2 - |a_{13}|^2}{\sigma^2 b_1}$$

$$SNR_1^{(2)} = \frac{b_1 b_2 - |a_{13}|^2}{\sigma^2 b_2} \quad (21)$$

$$SNR_1^{(3)} = \frac{a_{11} + a_{22} + a_{33}}{\sigma^2}$$

2) If vector sequences are $s^{(2)_1}$ and $s^{(3)_3}$, then the result is shown in Equation (22):

$$C_3 = \begin{bmatrix} b_1 + a_{33} & 0 & 0 \\ 0 & b_1 & a_{23} \\ 0 & a_{23}^* & b_3 \end{bmatrix} \quad (22)$$

For each branch of the receiver, an SNR is given as Equation (23):

$$SNR_2^{(1)} = \frac{b_1 b_3 - |a_{23}|^2}{\sigma^2 b_1}$$

$$SNR_2^{(2)} = \frac{b_1 b_3 - |a_{23}|^2}{\sigma^2 b_3} \quad (23)$$

$$SNR_2^{(3)} = \frac{a_{11} + a_{22} + a_{33}}{\sigma^2}$$

3) If vector sequences are $s^{(2)_2}$ and $s^{(3)_3}$, then the result is shown in Equation (24):

$$C_3 = \begin{bmatrix} b_3 & a_{12} & 0 \\ a_{12}^* & b_2 & 0 \\ 0 & 0 & b_1 + a_{33} \end{bmatrix} \quad (24)$$

For each branch of the receiver, an SNR is given as Equation (25)

$$SNR_3^{(1)} = \frac{b_2 b_3 - |a_{12}|^2}{\sigma^2 b_2} \quad (25)$$

$$SNR_3^{(2)} = \frac{b_2 b_3 - |a_{12}|^2}{\sigma^2 b_3}$$

$$SNR_1^{(3)} = \frac{a_{11} + a_{22} + a_{33}}{\sigma^2}$$

A second vector where the largest numerator of the SNR, given according to the same criterion as described above, can be selected. In order to select the largest numerator, the largest determinant of the matrix $C_3$ should be selected.

The exemplary 3×3 MIMO can be extended to 4×4 MIMO in the same manner, and further can be generalized to N×M MIMO. A space-time coding signal in 4×4 MIMO system can be expressed according to Equation (26), and performed combining, cancelling interferences and decoding in a receiver by selecting retransmission signal through the same scheme such as 3×3 MIMO system. The space-time coding signal in 4×4 MIMO system can be selected considering both transfer rate and interference signal of signal combined retransmission packet and previous defective packet.

$$\begin{array}{ccccccccccc} s^{(i)}_0 & s^{(i)}_1 & s^{(i)}_2 & s^{(i)}_3 & s^{(i)}_4 & s^{(i)}_5 & s^{(i)}_6 & s^{(i)}_7 & s^{(i)}_8 & s^{(i)}_9 \end{array} \quad (26)$$

$$\begin{bmatrix} s_1 & -s_2^* & -s_4^* & -s_3^* & -s_2^* & 0 & -s_4^* & 0 & -s_3^* & 0 \\ s_2 & s_1^* & s_3^* & -s_4^* & s_1^* & 0 & 0 & s_3^* & 0 & -s_4^* \\ s_3 & -s_4^* & -s_2^* & s_1^* & 0 & -s_4^* & 0 & -s_2^* & s_1^* & 0 \\ s_4 & s_3^* & s_1^* & s_2^* & 0 & s_3^* & s_1^* & 0 & 0 & s_2^* \end{bmatrix}$$

In MIMO system using N transmission antennas, the formation of space-time coding signals can be generalized as below. Signals are formed in signal type such as Alamouti space-time coding by selecting 2 antennas among the N transmission antennas, and the other of antennas don't transmit signals. N/2 pairs of antennas are formed as a pair of 2 antennas among the N transmission antennas, and each antenna pair are formed in signal type such as Alamouti space-time coding.

Also, MMSE as well as ZF for a interference signal cancelling scheme can be used in the present invention For better understanding, a description will now be made of a time-varying channel model and a retransmission ordering algorithm of a time-varying channel.

Time-Varying Channel Model

According to the foregoing example, it is assumed that a channel is constant for the maximum value of $K^{th}$ transmission. Therefore, a channel model for every retransmission is an M×N matrix, where N denotes the number of transmission antennas and M denotes the number of reception antennas.

If it is assumed that an M×N channel gain is constant in non-correlative complex Gaussian random variable per unit power (Raleigh Flat Fading), and is independently and identically distributed (i.i.d.), then the result is shown in Equation (27):

$$H_{M \times N} = \begin{pmatrix} h_{11} & h_{12} & \cdots & h_{1N} \\ h_{21} & h_{22} & & \vdots \\ \vdots & & \ddots & \vdots \\ h_{M1} & \cdots & \cdots & h_{MN} \end{pmatrix} \qquad (27)$$

where $E\{|h_{ij}|^2\}=1$, $E\{h_{ij}h_{lm}^*\}=0$, $i,l=1 \ldots N$, $j,m=1 \ldots M$, $i \neq l$ or $j \neq m$, and $E\{\bullet\}$ denotes an expected value.

Assume that for a new time-varying channel, a channel matrix remains as a constant during packet transmission. Autoregressive Model-1 (AR-1) is used for each channel in order to model a different channel matrix at each transmission. The modeling derives a correlation between the current channel and the previous channel. To generate this channel, the following process is performed.

1) As the complex Gaussian random variable per unit power is independently and identically distributed, an M×N random matrix is generated.

2) The AR-1 model is defined as Equation (28):

$$h_{ij}^{k+1} = -a_1 * h_{ij}^k + n \qquad (28)$$

where $a_1$ denotes a tap filter, n denotes complex Gaussian noises having power $\sigma_w^2$, and k denotes the number of transmissions.

To find the $a_1$ and $\sigma_w^2$ values, there is a need for a Yule-Walker Equation given as Equation (29):

$$\begin{bmatrix} R_h(0) & R_h^*(1) \\ R_h(1) & R_h(0) \end{bmatrix} \begin{bmatrix} 1 \\ a_1 \end{bmatrix} = \begin{bmatrix} \sigma_W^2 \\ 0 \end{bmatrix} \qquad (29)$$

where $R_h(0)$ and $R_h(1)$ are correlation values between samples of the previous channels.

3) In order to obtain parameters for the AR-1 model, the correlation values of Equation (30) are selected.

$$R_h(0)=1 \text{ and } R_h(1)=0.9 \qquad (30)$$

where the first value maintains the normalized power value at 1, and the second value defines a correlation with a previous value. With the use of these values, it is possible to design one channel having a very high correlation with the previous values. The possible results are shown in Equation (31):

$$a_1 = -0.9 \text{ and } \sigma_w^2 = 0.19 \qquad (31)$$

4) There is no need to normalize power of a new channel coefficient, and it can be simply shown as Equation (32):

$$E\{|h_{ij}^{k+1}|^2\} = |a_1|^2 + \sigma_{w2} = 1 \qquad (32)$$

Retransmission Ordering Algorithm of Time-Varying Channel

According to the foregoing example, it is assumed that for a channel, once a channel matrix is equally known for every retransmission after the first retransmission, it is possible to determine the retransmission ordering. However, in a new scenario, the channel matrix changes at every retransmission. Therefore, a new algorithm is used that checks the channel matrix every time there is a need for retransmission, instead of using a determinant criterion at the start of retransmission. With the use this algorithm, there is no way to determine a channel matrix to be used next, so a channel should be estimated using a particular scheme.

The next example indicates how the algorithm is applied for the 3×3 antennas (the number of antennas is extensible). For the 3×3 antennas, with the use of multi-Alamouti space-time coding, columns of a retransmission matrix can be shown as Equation (33):

$$s^{(1)} = \begin{bmatrix} -s_2^* \\ s_1^* \\ 0 \end{bmatrix} = \gamma_1 s^{(0)*} \quad s^{(2)} = \begin{bmatrix} -s_3^* \\ 0 \\ s_1^* \end{bmatrix} = \gamma_2 s^{(0)*} \quad s^{(3)} = \begin{bmatrix} 0 \\ -s_3^* \\ s_2^* \end{bmatrix} = \gamma_3 s^{(0)*} \qquad (33)$$

where $\gamma_1 = \begin{bmatrix} 0 & -1 & 0 \\ 1 & 0 & 0 \\ 0 & 0 & 0 \end{bmatrix}$, $\gamma_2 = \begin{bmatrix} 0 & 0 & -1 \\ 0 & 0 & 0 \\ 1 & 0 & 0 \end{bmatrix}$, and $\gamma_3 = \begin{bmatrix} 0 & 0 & 0 \\ 0 & 0 & -1 \\ 0 & 1 & 0 \end{bmatrix}$.

If retransmission $R_2$ is requested after the first transmission $R_1$, a determinant of Equation (34) is checked to determine one of the possible alternatives.

$$det|C_1 + \gamma_i^T \tilde{C}_2^* \gamma_i| \; i=1,2,3 \qquad (34)$$

where $C_1 = H_1^{\Psi} H_1$ and $\tilde{C}_2 = E\{H_2^{\Psi} H_2\} = E\{(a_1 H_1 + n)^{\Psi}(a_1 H_1 + n)\} = a_1^2 H_1^{\Psi} H_1 + E\{n^{\Psi} n\} = a_1^2 C_1 + 3\sigma_w^2 I$. In addition, I is a 3×3 identity matrix, and n is a 3×3 noise matrix. The next channel is estimated using an expected value of the AR-1 model defined above. If the third transmission $R_3$ is requested, a new determinant that should be checked so as to determine one of the remaining two signals is given as Equation (35):

$$det|C_1 + \gamma_i^T \tilde{C}_2^* \gamma_i + \gamma_j^T \tilde{C}_3^* \gamma_j| \qquad (35)$$

where i denotes signal index in second transmission, j denotes signal index in third transmission, and j belongs to a number set to which i does not belong. In Equation (34), $C_2$ derives from an actual channel matrix received at second retransmission ($H_2^{\Psi} H_2$). Similarly, even for the third transmission, there is still no way to determine $H_3$, so its value can be estimated by Equation (36):

$$\tilde{C}_3 = E\{H_3^{\Psi} H_3\} = a_1^2 C_2 + 3\sigma_w^2 I \qquad (36)$$

In addition, if fourth transmission is requested, the last remaining signal is used.

Numerical Analysis

A description will now be made of simulation results on 5 exemplary cases for an N×M MIMO system according to the present invention. It is assumed that the simulation data used is constant in complex Gaussian random variable per unit power, and is independently and identically distributed, thereby securing 9 channel gains. A size of an information bit packet is 522 bits, and 16 CRC bits are added to each packet. The reason for determining the size of the information bit packet as 522 bits is to make it possible to split the information bit packet into 3, 4, 5 or 6 sub-packets. The detailed particulars for the environmental variables of the simulation are defined along with the main program codes used in the following exemplary simulation, and the codes of functions used in the main program.

Figure 2:
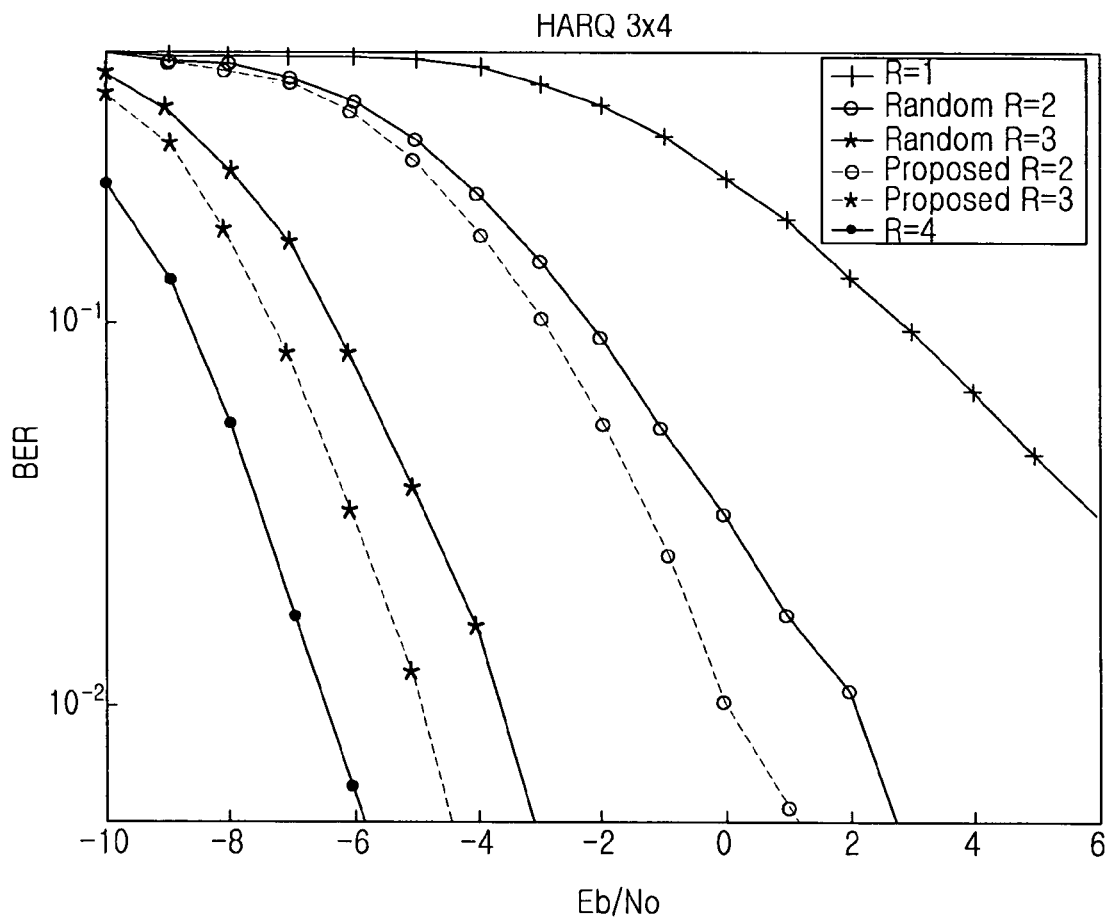
FIG. 2 is a diagram illustrating a Bit Error Rate (BER) versus a signal-to-noise ratio $E_b/N_0$ for $R_2$ and $R_3$ at which the algorithm is used for a scenario of 3×4 according to the present invention.
Figure 3:
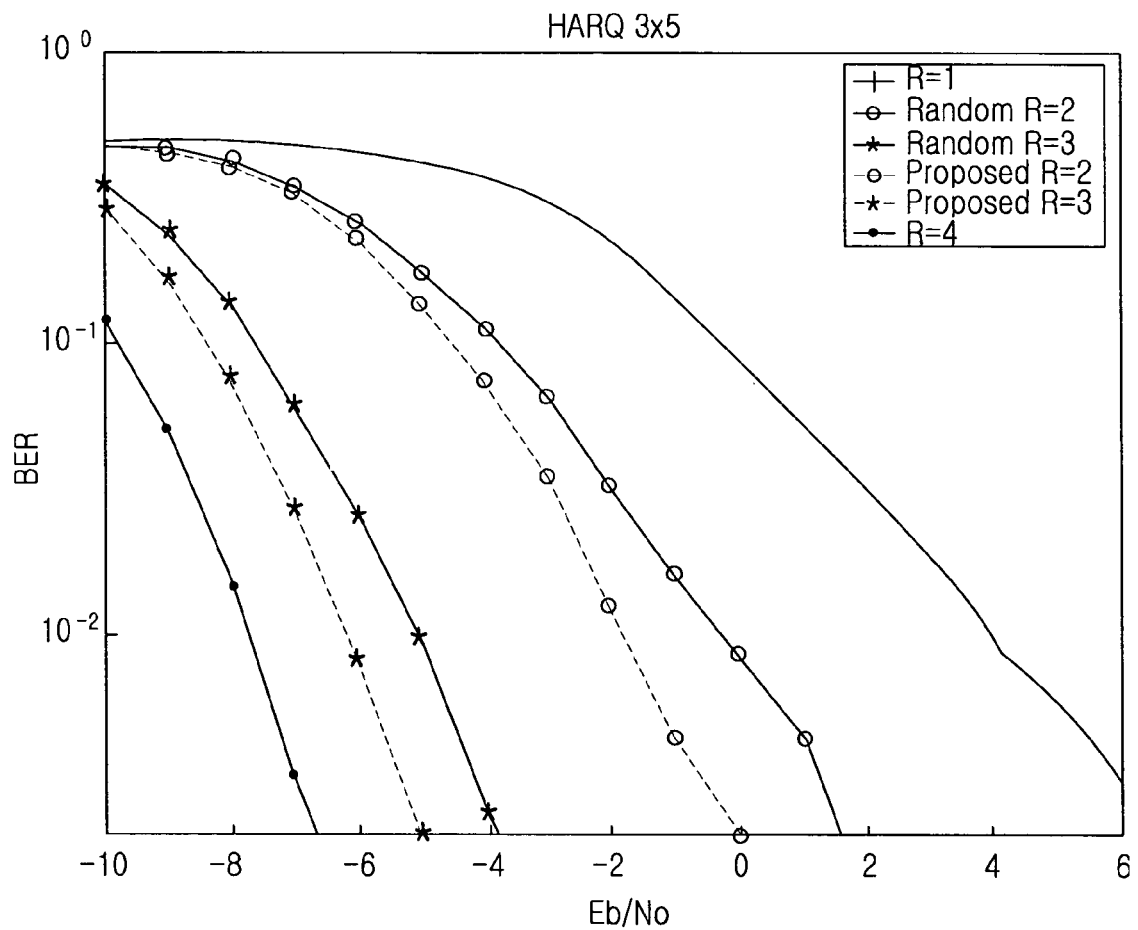
FIG. 3 is a diagram illustrating a BER versus $E_b/N_0$ for $R_2$ and $R_3$ at which the algorithm is used for a scenario of 3×5 according to the present invention.

FIGS. 2 and 3 are diagrams illustrating a Bit Error Rate (BER) versus a signal-to-noise ratio $E_b/N_0$ for $R_2$ and $R_3$ at which the algorithm is used for different scenarios of 3×4 and 3×5 according to the present invention.

Referring to FIGS. 2 and 3, $R_1$ represents the first transmission and $R_4$ represents the results after completion of the transmission. The term "Random" is used in FIGS. 2 and 3 to denote a random selection of Alamouti vectors for the transmissions $R_2$ and $R_3$. It can be understood from the results of both FIGS. 2 and 3 that the simulation based on the determinant criterion according to the present invention shows superior performance, compared with the Random simulation.

Figure 4:
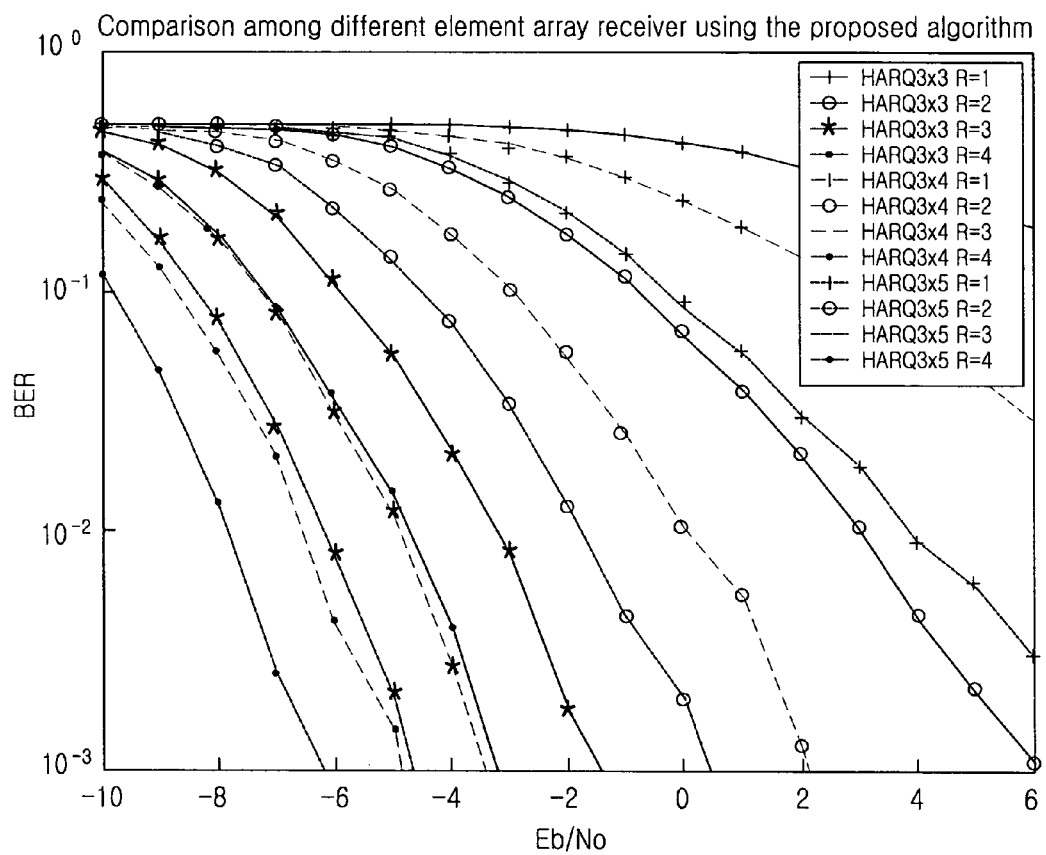
FIG. 4 is a diagram illustrating performance comparison between 3×3, 3×4 and 3×5 MIMO systems using the algorithm according to the present invention.

FIG. 4 is a diagram illustrating performance comparison between 3×3, 3×4 and 3×5 MIMO systems using the algorithm according to the present invention. It can be noted from FIG. 4 that when the number of transmission antennas is N=3, and as the number M of reception antennas increases, the performance also increases.

Figure 5:
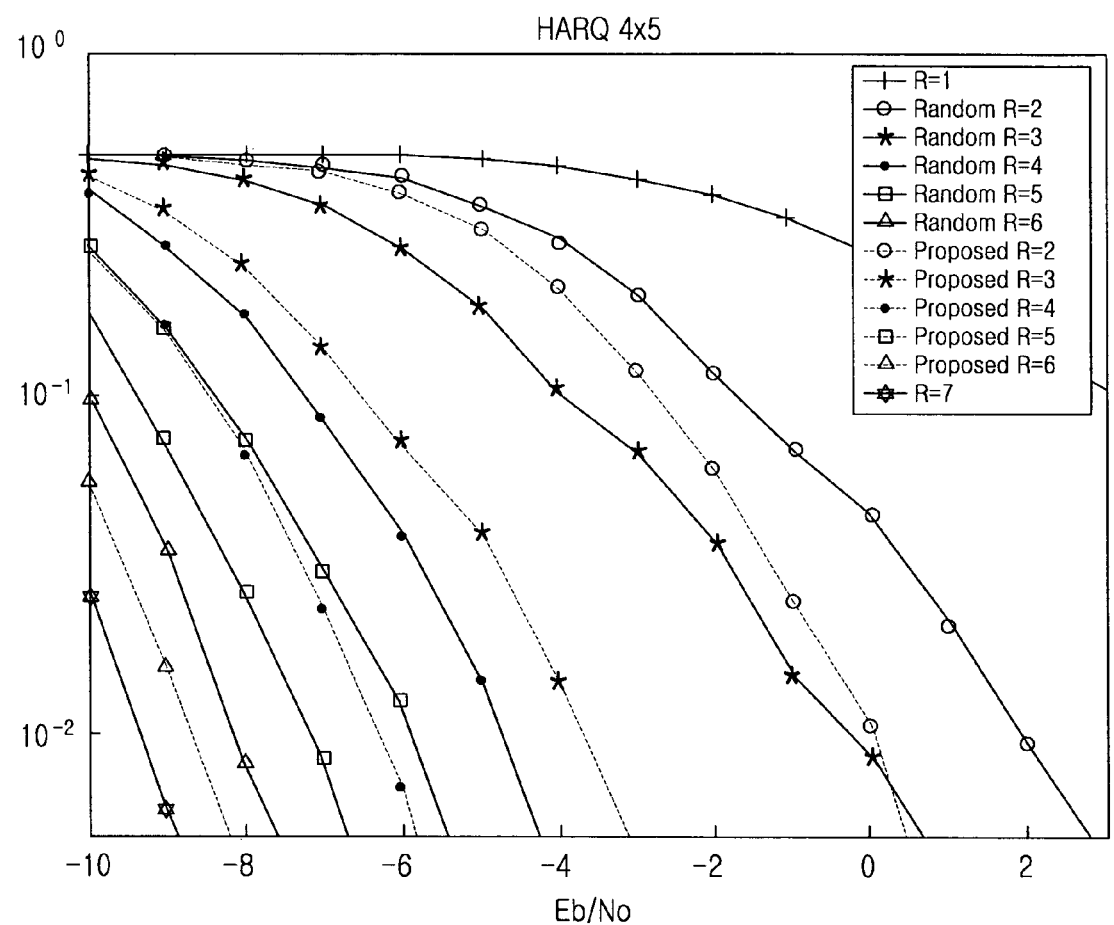
FIG. 5 is a diagram illustrating a BER versus $E_b/N_0$ for 4×5 MIMO according to the present invention.

FIG. 5 is a diagram illustrating a BER versus $E_b/N_0$ for 4×5 MIMO according to the present invention.

Referring to FIG. 5, the proposed algorithm of FIGS. 2 and 3 is applied for $R_2$ to $R_6$, $R_1$ represents the first transmission, and $R_7$ represents the results after the completion of the transmission. Similarly, the term "Random" is used in FIG. 5 to denote a random selection of Alamouti vectors for the transmissions $R_2$ and $R_6$. Likewise, it can be understood from the results of FIG. 5 that the simulation based on the determinant criterion according to the present invention shows superior performance, compared with the Random simulation.

Figure 6:
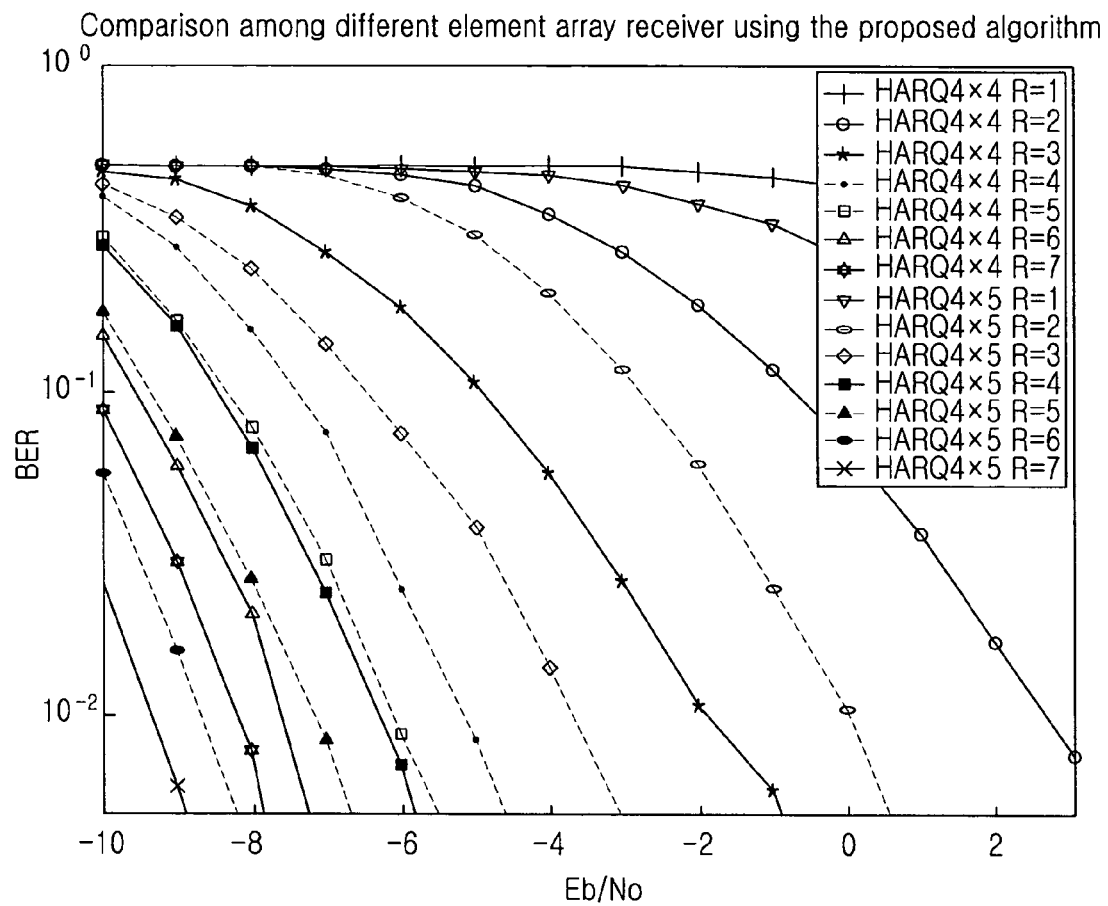
FIG. 6 is a diagram illustrating performance comparison between 4×4 and 4×5 MIMO systems using the algorithm according to the present invention.

FIG. 6 is a diagram illustrating performance comparison between 4×4 and 4×5 MIMO systems using the algorithm according to the present invention. It can be noted from FIG. 6 that even when the number of transmission antennas is N=4, as the number M of reception antennas increases, the performance also increases.

According to the simulation results of FIGS. 2 to 6, the increase in the number M of reception antennas contributes to an improvement of the performance. It is noted that when a comparison is made between, for example, 3×3, 3×4 and 3×5, the performance is improved by almost 6 dB at BER=$10^{-3}$ for R=2. In addition, 3×4, 3×5 or 4×5 MIMO is superior to the random selection in terms of the performance of the proposed algorithm. M should be greater than or equal to N (M≧N), and ZF is used because the number of resultant channel matrixes after each retransmission is not one.

For reference, the composed main program codes used to obtain the simulation results of FIGS. 2 to 6, and the codes of functions used in the main program are illustrated by example, in the computer program listing appendix that corresponds to the present application.

What is claimed is:

1. A method for ordering retransmissions in a Multi-Input Multi-Output (MIMO) system using N×M antennas, the method comprising:
    splitting, at a transmitter, a coded data stream into N sub-packets, and transmitting the N sub-packets to a receiver via N transmission antennas;
    removing, at the receiver, interferences of the N sub-packets received via M reception antennas, and independently decoding the interference-removed sub packets;
    transmitting, at the receiver to the transmitter, one of an acknowledgement (ACK) and a negative acknowledgement (NACK) depending on errors included in the decoded sub-packets; and
    upon receipt of the NACK, retransmitting to the receiver, at the transmitter, a sub-packet retransmission based on an Alamouti space-time coding scheme in descending order of signal to noise ratios (SNRs).

2. The method of claim 1, further comprising canceling interference and decoding by combining, at the receiver, the retransmitted sub-packet with the previous defective sub-packet on a symbol level.

3. The method of claim 1, wherein the interference removing is achieved by Minimum Mean Square Examination (MMSE) or Zero Forcing (ZF).

4. The method of claim 1, wherein a signal-to-noise ratio (SNR) criterion of each reception antenna, determined at the receiver at every retransmission, is used for selection of the retransmission ordering.

5. The method of claim 4, wherein a highest SNR of each reception antenna maximizes a determinant that derives a channel matrix after each retransmission.

6. The method of claim 5, wherein the channel matrix is adaptively changed by checking a channel every time there is a need for retransmission.

7. The method of claim 5, wherein the channel matrix is expressed as $$H_{M \times N} = \begin{pmatrix} h_{11} & h_{12} & \cdots & h_{1N} \\ h_{21} & h_{22} & & \vdots \\ \vdots & & \ddots & \vdots \\ h_{M1} & \cdots & \cdots & h_{MN} \end{pmatrix}.$$

8. A transmission apparatus for ordering retransmissions in a Multi-Input Multi-Output (MIMO) system using N×M antennas, the apparatus comprising:
    a channel encoder for encoding input information bits based on a coding scheme, and generating coded packets having a specific length;
    a spatial demultiplexer for encoding the coded packets based on a space-time coding scheme, and parallel-converting the encoded packets into N sub-blocks;
    symbol mappers for modulating the N sub-blocks output from the spatial demultiplexer into modulation symbol streams using a modulation scheme, mapping the symbol streams to times and frequencies based on a pilot sub-carrier position set pattern, and outputting the mapping results to associated transmission antennas; and
    N transmission antennas for separately transmitting N sub-packets split from each of the coded symbol streams,
    wherein, upon receipt of a negative acknowledgement (NACK) due to errors included in the transmitted sub-packets, the transmission apparatus arranges columns of a retransmission matrix based on an Alamouti space-time coding scheme in a descending order of signal to noise ratios (SNRs), and retransmits a retransmission sub-packet according to the arranged columns to a reception apparatus.

9. The transmission apparatus of claim 8, wherein a signal-to-noise ratio (SNR) criterion of each reception antenna, determined at the receiver at every retransmission, is used for selection of the retransmission ordering.

10. The transmission apparatus of claim 9, wherein a highest SNR of each reception antenna maximizes a determinant that derives a channel matrix after each retransmission.

11. The transmission apparatus of claim 10, wherein the channel matrix is adaptively changed by checking a channel every time there is a need for retransmission.

12. The transmission apparatus of claim 10, wherein the channel matrix is expressed as $$H_{M \times N} = \begin{pmatrix} h_{11} & h_{12} & \cdots & h_{1N} \\ h_{21} & h_{22} & & \vdots \\ \vdots & & \ddots & \vdots \\ h_{M1} & \cdots & \cdots & h_{MN} \end{pmatrix}.$$

13. A reception apparatus for ordering retransmissions in a Multi-Input Multi-Output (MIMO) system using N×M antennas, the apparatus comprising:
    M reception antennas for separately receiving N sub-packets split from a coded symbol stream;
    a pre-combiner for combining a sub-packet retransmitted according to retransmission ordering, with a previous defective sub-packet on a symbol level; and
    a detector for removing interference of a signal received from the pre-combiner, splitting the interference-removed signal into N transmission data sub-packets after said removing, and outputting independently decoded sub-packets;

wherein the reception apparatus transmits one of an acknowledgement (ACK) and a negative acknowledgement (NACK) to a transmission apparatus depending on errors included in the decoded sub-packets and receives from the transmission apparatus the retransmitted sub-packet in response to the NACK transmitted by the reception apparatus, and the retransmission ordering comprises arranging columns of a retransmission matrix based on an Alamouti space-time coding scheme in descending order of signal to noise ratios (SNRs).

14. The reception apparatus of claim 13, wherein the interference removing is achieved by Minimum Mean Square Examination (MMSE) or Zero Forcing (ZF).

15. The reception apparatus of claim 13, wherein a signal-to-noise ratio (SNR) criterion of each reception antenna, determined at the receiver at every retransmission, is used for selection of the retransmission ordering.

16. The reception apparatus of claim 15, wherein a highest SNR of each reception antenna maximizes a determinant that derives a channel matrix after each retransmission.

17. The reception apparatus of claim 16, wherein the channel matrix is adaptively changed by checking a channel every time there is a need for retransmission.

18. The reception apparatus of claim 16, wherein the channel matrix is expressed as $$H_{M \times N} = \begin{pmatrix} h_{11} & h_{12} & \cdots & h_{1N} \\ h_{21} & h_{22} & & \vdots \\ \vdots & & \ddots & \vdots \\ h_{M1} & \cdots & \cdots & h_{MN} \end{pmatrix}.$$

19. A method for ordering retransmissions in a Multi-Input Multi-Output (MIMO) system using N×M antennas, the method comprising:
splitting, by a transmitter, a coded data stream into N sub-packets;
transmitting the N sub-packets from the transmitter to a receiver via N transmission antennas;
removing, at the receiver, interferences of the N sub-packets received via M reception antennas, and independently decoding the interference-removed sub packets;
receiving by the transmitter from the receiver, a negative acknowledgement (NACK) in response to errors included in the N sub-packets received by M reception antennas that have had their interferences removed and been independently decoded by the receiver;
arranging, by the transmitter, columns of a retransmission matrix based on an Alamouti space-time coding scheme in descending order of signal to noise ratios (SNRs); and
retransmitting from the transmitter to the receiver a retransmission sub-packet according to the arranged columns in response to the received NACK.

20. A reception method for retransmissions in a Multi-Input Multi-Output (MEMO) system using N×M antennas, the method comprising:
transmitting, by a receiver, one of an acknowledgement (ACK) and a negative acknowledgement (NACK) to a transmitter depending on errors included in one or more decoded sub-packets;
receiving, from the transmitter, a packet retransmitted in response to the NACK;
receiving N sub-packets split from a coded symbol stream separately by M reception antennas;
combining, by a pre-combiner, the packet retransmitted according to a retransmission ordering, with a previous defective packet on a symbol level;
removing, by a detector, interference of a signal received from the pre-combiner;
splitting, by the detector, the interference-removed signal into N transmission data sub-packets; and
outputting, by the detector, independently decoded sub-packet signals,
wherein the retransmission ordering comprises arranging columns of a retransmission matrix based on an Alamouti space-time coding scheme in descending order of signal to noise ratios (SNRs).

* * * * *